(12) United States Patent
Noam et al.

(10) Patent No.: US 10,637,548 B2
(45) Date of Patent: Apr. 28, 2020

(54) SYSTEM AND METHOD FOR REDUCED OVERHEAD FEEDBACK SCHEME FOR INTERFERENCE MITIGATION IN CELLULAR NETWORKS

(71) Applicant: BAR-ILAN UNIVERSITY, Ramat Gan (IL)

(72) Inventors: Yair Noam, Mevaseret Zion (IL); Benjamin Moshe Zaidel, Tel Aviv (IL); Naama Kimelfeld Shahak, Petach Tikva (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 16/315,530

(22) PCT Filed: Jul. 7, 2017

(86) PCT No.: PCT/IL2017/050765
§ 371 (c)(1),
(2) Date: Jan. 4, 2019

(87) PCT Pub. No.: WO2018/008036
PCT Pub. Date: Jan. 11, 2018

(65) Prior Publication Data
US 2019/0238197 A1    Aug. 1, 2019

Related U.S. Application Data

(60) Provisional application No. 62/359,247, filed on Jul. 7, 2016.

(51) Int. Cl.
*H04B 7/04*    (2017.01)
*H04B 7/0456*    (2017.01)
(Continued)

(52) U.S. Cl.
CPC ......... *H04B 7/0482* (2013.01); *H04B 7/0452* (2013.01); *H04B 7/0456* (2013.01); *H04B 7/0626* (2013.01); *H04L 5/0035* (2013.01)

(58) Field of Classification Search
CPC .. H04B 7/0482; H04B 7/0452; H04B 7/0456; H04B 7/0626; H04L 5/0035
(Continued)

(56) References Cited

U.S. PATENT DOCUMENTS

| 7,912,014 B2 | 3/2011 | Molisch et al. |
| 2007/0211813 A1 | 9/2007 | Talwar et al. |

(Continued)

FOREIGN PATENT DOCUMENTS

CN    101834701 A    9/2010

OTHER PUBLICATIONS

Sun et al; "Interference Management Through COMP in 3GPP LTE-Advanced Networks." IEEE Wireless Communications pp. 59-66. (Feb. 2013).

(Continued)

*Primary Examiner* — Michael R Neff
(74) *Attorney, Agent, or Firm* — Browdy and Neimark, P.L.L.C.

(57) ABSTRACT

A system and methods are provided for reducing radio interference in a cellular network comprising a plurality of Base Stations (BSs) and a plurality of User Equipment devices (UEs). The method includes receiving at a base station (BS) serving a user equipment device (UE) a feedback signal, estimated by the UE in response to a radio signal, wherein the feedback signal includes a quantized representation of a direct channel of the BS. The method further includes determining at the BS a pre-coding matrix having a smaller number of dimensions than a number of (Continued)

antennas of the BS and applying the pre-coding matrix to filter subsequent radio signals transmitted by the BS.

9 Claims, 5 Drawing Sheets

(51) Int. Cl.
    *H04B 7/0452*     (2017.01)
    *H04B 7/06*     (2006.01)
    *H04L 5/00*     (2006.01)

(58) Field of Classification Search
    USPC .......................................... 375/267
    See application file for complete search history.

(56) References Cited

U.S. PATENT DOCUMENTS

| | | |
|---|---|---|
| 2008/0049709 A1 | 2/2008 | Pan et al. |
| 2009/0323849 A1* | 12/2009 | Bala ................. H04B 7/0417 375/267 |
| 2010/0172430 A1* | 7/2010 | Melzer ............... H04B 7/0417 375/267 |
| 2012/0099540 A1 | 4/2012 | Doppler et al. |
| 2013/0250885 A1 | 9/2013 | Davydov et al. |
| 2014/0064354 A1* | 3/2014 | Nakano ............ H04L 25/03955 375/233 |
| 2015/0030092 A1 | 1/2015 | Krishnamurty |
| 2015/0223161 A1 | 8/2015 | Xiao et al. |
| 2018/0006690 A1* | 1/2018 | Shepard ............... H04B 7/0452 |

OTHER PUBLICATIONS

Sheng et al; "Iterative Nonlinear Precoding and Link Adaptation for MU-MIMO With CSI Impairments" In 2012 International Conference on Computing, Networking and Communications (ICNC).

Gesbert, et al; "Multi-Cell MIMO Cooperative Networks: A New Look at Interference" IEEE Journal on Selected areas of Communications, vol. 28, No. 9, pp. 1-29.(Dec. 2010).

Kerret, et al; "Spatial CSIT allocation policies for network MIMO channels," IEEE Transactions on Information Theory, vol. 60, pp. 4158-4169. (Mar. 2014).

Wu, et al; "Degrees of Freedom of the Interference Channel: a General Formula", EEE International Symposium on Information Theory Proceedings, pp. 1344-1348. (2011).

\* cited by examiner

SYSTEM AND METHOD FOR REDUCED OVERHEAD FEEDBACK SCHEME FOR INTERFERENCE MITIGATION IN CELLULAR NETWORKS

FIELD OF THE INVENTION

The present, invention relates to cellular networks in general, and in particular to systems and methods for reducing interference in cellular networks.

BACKGROUND OF THE INVENTION

Mobile communication has developed extensively in the past few decades in terms of the diversity of applications, data rates, and the heterogeneity of device types. This growth requires constant technological advances to meet the increasing quality of service and capacity demand. Increasing capacity is a very challenging task due to the scarcity of the available electromagnetic spectrum and the aggressive frequency reuse; i.e., the same frequencies are used concurrently by adjacent Base Stations (BSs). This creates interference between BSs and User Equipment devices (UEs) in adjacent cells, interference which is a major factor in limiting overall network throughput. Thus, different levels of coordination/cooperation among BSs, known as Coordinated Multi-point (CoMP) techniques, are a key to enhancing the network capacity and to keeping interference at an adequate level to ensure service availability.

In downlink CoMP, BSs coordinate transmission to mitigate interference to each other's terminals or work as one to become a single distributed BS which serves all the UEs in a range by applying joint precoding and decoding. Two types of cooperation are Coordinated Scheduling and Coordinated Beamforming (CS/CB) and Joint Processing (JP), which increases the number of degrees of freedom. These schemes require joint optimization of BSs' precoding matrices. In general they require distribution of Channel State Information (CSI); i.e., the interference channel between each BS and UE. To reduce complexity and CSI acquisition overhead, BSs may cooperate only within clusters and treat out-of-cluster interference (OCI) as noise.

UEs estimate direct and interference channels from each BS. They then quantize the estimated channels according to codebooks designed for this purpose and send the quantized estimates as feedback to the BSs.

Previous work on CSI feedback includes work on codebook design and bit allocation based on channel types (i.e., direct channel or interference channel), as well as work on optimizing other network parameters, such as bit rate. Such work includes Wild, "A rake-finger based efficient channel state information feedback compression scheme for the MIMO OFDM FDD downlink," Ï Vehicular Technology Conference (VTC 2010-Spring), 2010 IEEE 71st, May 2010, whose disclosure is incorporated herein by reference. Efficient CSI codebooks can exploit temporal correlation and/or allocate a different number of bits to direct-channel feedback and interference-channel feedback, while taking channel gain into account. A further approach has been to allocate feedback bits to maximize the sum-rate. Other methods combine quantization with precoding design while taking into account very little feedback, or determine suitable transmission rank and scheduling with limited feedback. Furthermore, the feedback overhead can be reduced by excluding users with low channel gains from feeding back their CSI. Another technique for precoding design without feedback or with very little feedback is to apply distributed iterative procedures, where in each iteration the BSs adjust their precoding matrices based on local measurements, such as the overall interference at each UE. In general, iterative schemes provide good performance in slow varying channels, but are less suitable for moderate/high Doppler spread. Despite the progress in reducing CSI feedback overhead, or compensating for limited feedback, this constraint is still a major factor in limiting CoMP performance, and is recognized as an important challenge in the development of 5G networks.

Methods for handling inter-cell interference are described in U.S. Pat. No. 7,912,014 to Molisch, et al., whose disclosure is incorporated herein by reference. Additional methods are described in Gesbert, et al., "Multi-Cell MIMO Cooperative Networks: A New Look at Interference" (IEEE Journal on Selected areas of Communications, Vol. 28, No. 9, December 2010), and in Kerret, et al., "Spatial CSIT allocation policies for network MIMO channels," (IEEE Transactions on Information Theory, vol. 60, pp. 4158-4169, July 2014), whose disclosures are incorporated herein by reference. Formulas for interference channels are presented in Wu, et al., "Degrees of Freedom of the Interference Channel: a General Formula", 2011 IEEE International Symposium on Information Theory Proceedings, 1344-1348, whose disclosure is incorporated herein by reference. Notation: Matrices and vectors are denoted by boldface symbols, where italicized boldface letters, e.g. x, denote column vectors; whereas non-italicized boldface letters, e.g. x, denote row vectors, and bold capital letters denote matrices. $(\ )^T$ and $(\ )^\dagger$ denote the transpose and conjugate transpose operations, respectively. $I_N$ is the N×N identity matrix, $Tr(\cdot)$ (denotes the trace of a matrix and $\|\cdot\|$ denotes the Frobenius norm.
Notation: Matrices and vectors are denoted by boldface symbols, where italicized boldface letters, e.g. x, denote column vector; whereas non-italicized boldface letters, e.g. x, denote row vector, and bold capital letters denote matrices. The conjugate transpose of matrix or vector is denoted by $(\ )^*$, $I_N$ is the N×N identity matrix, $tr(\cdot)$ denotes the trace of a matrix and $\|\cdot\|$ denotes the Frobenius norm.

SUMMARY OF THE INVENTION

Objects of the present invention are to provide a system and method for reducing CSI congestion and improving interference suppression. In embodiments of the present invention, the interference channel dimensions are reduced by restricting the interfering BS to a well-chosen signal subspace.

Embodiments of the present invention provide a method for reducing radio interference in a cellular network comprising a plurality of Base Stations (BSs), each having a plurality of antennas, and a plurality of User Equipment devices (UEs), the method comprising the steps of: receiving at a base station (BS) serving a user equipment device (UE) a feedback signal, estimated by the UE in response to a radio signal, wherein the feedback signal includes a quantized representation of a direct channel of the BS; determining at the BS a pre-coding matrix having a smaller number of dimensions than the number of antennas of the BS, wherein the first column of the pre-coding matrix is the quantized representation of the direct channel estimated by the UE and the remaining columns of the pre-coding matrix constitute an orthonormal base; and applying the precoding matrix to filter subsequent radio signals transmitted by the BS.

In some embodiments, the subsequent radio signals include a second radio signal received by a, non-intended user equipment device (UE2), and the method further comprises reducing residual interference in an interference channel of the BS to the UE2 responsively to receiving from the UE a second feedback signal including a quantized representation of the interference channel, the second feedback signal being generated by the UE2 responsively to the second radio signal. The steps may also be repeated iteratively to maintain a high signal-to-noise ratio of the network.

There is also provided by further embodiments of the invention, a computer-based system configured as a base station in a cellular network that includes a plurality of Base Stations (BSs), each having a plurality of transmitters, and a plurality of User Equipment devices (UEs), the system comprising a processor, multiple transmitters, and a memory, wherein the memory includes instructions that when executed by the processor perform the steps of: generating from the transmitters a radio signal; receiving from a user equipment device (UE) a feedback signal, estimated by the UE1 in response to the radio signal, wherein the feedback signal includes a quantized representation of a direct channel of the BS; determining a pre-coding matrix having a smaller number of dimensions than the number of transmitters, wherein the first column of the pre-coding matrix is the quantized representation of the direct channel estimated by the UE and the remaining columns of the pre-coding matrix constitute an orthonormal base; and applying the precoding matrix to filter subsequent radio signals transmitted by the BS1.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
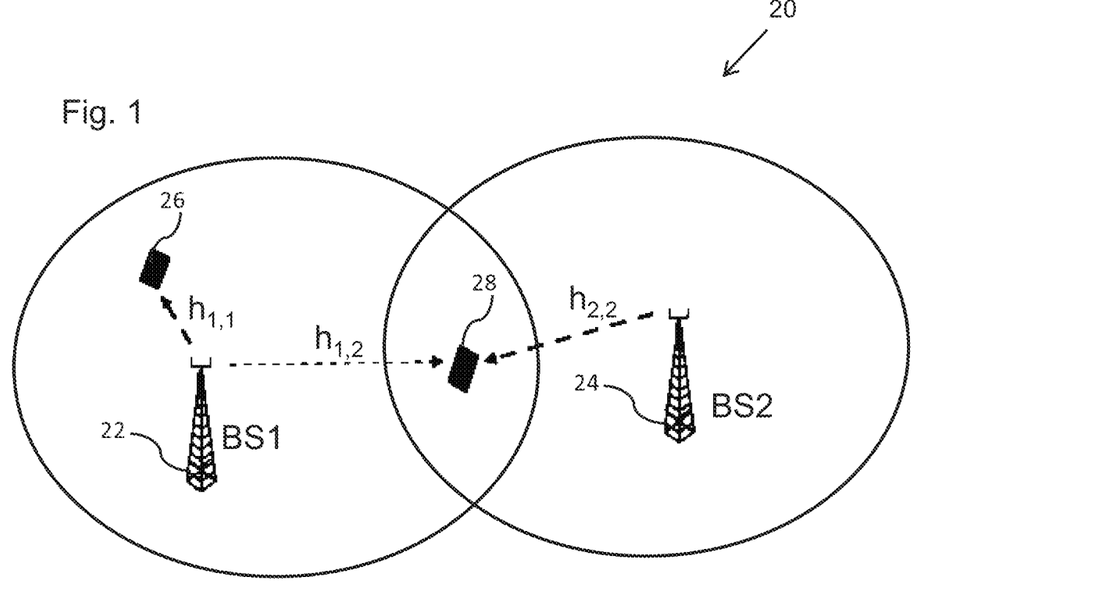
FIG. 1 is an illustrative schematic of a cellular broadband network with two base stations and two user equipment devices, in accordance with an embodiment of the present invention.

Reference is now made to FIG. 1, showing a simplified diagram of a cellular network 20 comprising two cellular base stations BS1 (22) and BS2 (24) and two cellular user equipment devices UE1 (26) and UE2 (28). It is to be understood that more base stations and user equipment devices are typically active in a, cellular network.

UE1 is being serviced by BS1. UE2 is being serviced by BS2 while also receiving signals from BS1; that is, the signals of BS1 sensed by UE2 interfere with the signals received from BS2. The network may be analyzed as a multiple-input, single-output (MISO) interference channel, where each BS employs n transmit antennas, and each UE employs a single receiver antenna.

BS transmitters transmit initial signals, which may be pilot or training signals, from which the served UEs (intended UEs) estimate the direct channels. Let $\hat{h}_{ii}$, i=1, 2, denote the estimated direct channel in a first round of channel estimation.

Network 20 is a two-user MISO interference channel, in which the sum of signals received by a given UE (also referred to as $Rx_i$) is $$y_i = h_{ii}^\dagger t_i + \alpha_i h_{ij}^\dagger t_j + z_i \quad (1)$$

where $z_i \sim CN(0,1)$, $i, j \in \{1, 2\}$, $i \neq h$; hereinbelow, i is always not equal j; i.e., $i \in \{1, 2\}$ and $j \in \{1, 2\} \setminus \{i\}$. The channels $h_{iq} \in \mathbb{C}^{nt}$, $i, q \in \{1, 2\}$, are flat Rayleigh-fading spatially-uncorrelated; i.e., $h_{iq} \sim CN(0, I_{nt})$, and $z_i$ is an additive white noise satisfying $z_i \sim N(0,1)$. We assume block fading; i.e., the channels remain constant over a block of length L, also dubbed channel coherence interval, after which a new channel is drawn independently from the same distribution. It is further assumed that the L is large enough to facilitate coherence detection, but on the other hand, L is much smaller than the codeword; i.e., the codeword is transmitted over many channel realizations, and if the codeword length is taken to infinity, the number of channel realizations over which the codeword spans also approach infinity. The coefficients $\alpha_1$, $\alpha_2 > 0$ represent the relative strength of cross link channels with respect to the direct channel. Each transmitter is subjected to a maximum short-term power constraint $$Tr(K_m) \leq P_m \quad (2)$$

where $K_m = E[t_m t_m^\dagger]$. Another supposition is that there is no channel reciprocity. This means that the downlink channels are different than the uplink channels, and that CSI from each UE is obtained through channel estimation by each respective UE and then, fed back to the corresponding BS using quantization bits (as determined by a preset codebook).

We assume that for CoMp processing, each UE independently codes the channel information for each BS. Signals from non-serving BSs are processed as noise: a communication scheme known as Single User Detection (SUD). A given UE ($Rx_i$), while not able to decode an interference signal from a given BS ($Tx_j$), does estimate the interference channel $h_{ij}$ and feeds back a quantization $\hat{h}_{ij}$ of that channel, to the interfering BS. This is in addition to the feeding back $\hat{h}_{ii}$, the quantization of the direct channel $h_{ii}$, to the serving BS ($Tx_i$). Such CSI enables the transmitters to mitigate interference to non-intended receivers. Furthermore, it the transmitters share their local CSI, it is possible to jointly optimize their beamforming vectors which further improve the overall system throughput. An example for such a cooperation is the CS/CB CoMP scheme in cellular networks. Under the LTE-advanced protocol for mobile broadband, for example, there is a dedicated link between BSs, dubbed X2, to facilitate such a cooperation. The feedback does not have to be direct; i.e., the non-intended UE can feedback the interference channel to its serving BS, and the latter can forward it to the interfering BS via a dedicated link, such as the X2 as specified for LTE.

In embodiments of the present invention, a precoding scheme implemented by one or more BSs induces effective channels of reduced dimensions, which can then be more accurately estimated for any fixed number of quantization bits.

Let $\hat{h}_{ii}$, i=1, 2 denote the estimated direct channel, estimated by each UE for its serving BS, after receiving, for example, an initial signal from the BS (which may be a training signal). This channel estimation is then quantized and fed back to the BS as $\hat{h}_{ii}$. Let, $$\hat{h}_{ii}=U_{ii}[1\ 0\ \ldots\ 0]^T. \quad (3)$$

where $U_{ii} \in \mathbb{C}^{n_t \times n_t}$ and $[1\ 0\ \ldots\ 0]^T$ constitutes the singular value decomposition (SVD) of $\hat{h}_{ii}$. That is, one column, for example the first column of $U_{ii}$ is set equal to $\hat{h}_{ii}$ and all of the columns of $U_{ii}$ are set orthonormal to each other. Now let $A_{ii}$ denote the $n_T \times m$ matrix obtained by taking the $\hat{h}_{ii}$ column of $U_{ii}$ and an arbitrary choice of additional m−1 columns of $U_{ii}$. For example, $A_{ii}$ is set as the first m columns of $U_{ii}$.

The matrix $A_{ii}$ is then set at the front-end of the transmitters, as a "pre-coding matrix", such that each subsequent vector signal transmitted is multiplied by $A_{ii}$. That is, $A_{ii}$ is employed as a front-end transmission filter. As a result, a MISO interference channel of reduced dimensions of the following form is induced:

$$y_1 = h_{11}^\dagger A_{11} t_1 + h_{12}^\dagger A_{22} t_2 + n_1$$

$$y_2 = h_{21}^\dagger A_{11} t_1 + h_{22}^\dagger A_{22} t_2 + n_2, \quad (4)$$

where $t_1$ and $t_2$ are of dimension m×1.

We denote the effective channels induced by the above scheme as $$\tilde{h}_{ii} = A_{ii}^\dagger h_{ii}, \tilde{h}_{ji} = A_{ii}^\dagger h_{ji}, i,j=1,2, i \neq j. \quad (5)$$

Accordingly, the MISO interference channel in (4) can be rewritten as $$y_1 = \tilde{h}_{11}^\dagger t_1 + \tilde{h}_{12}^\dagger t_2 + n_1$$

$$y_2 = \tilde{h}_{21}^\dagger t_1 + \tilde{h}_{22}^\dagger t_2 + n_2. \quad (6)$$

Because the first column of the pre-coded matrix $A_{ii}$ is $\hat{h}_{ii}$, that is, the direct channel estimate, the subsequent signal reception by UE1 from BS1 is not impaired by subsequent signal transmissions from BS1 being filtered by $A_{ii}$.

After generating and employing the pre-coding matrix, another round of channel estimation is performed, where the UEs estimate the cross-interference channel, and an estimate of each respective cross-interference channel vector $\tilde{h}_{ij}$ is fed back to the interfering BS. Because the dimensions of the channel generated by BS1 have been reduced, the number of quantization bits for providing an estimate of the interference channel may be reduced (or the accuracy of representing the reduced number of channels may be increased by using the same number of bits to communicate the quantized estimates).

The invention reduces the overhead of CSI acquisition and distribution in cooperative multipoint transmission; an overhead which is currently a major limiting factor of CoMP. The invention significantly reduces the number of bits required to feed back MIMO interference channels in CoMP systems, where UEs cooperate with interfering BSs of other cells. A major problem for CS/CB CoMP is the residual interference, inflicted by the interfering BSs on out-of-cell UEs, due to the quantization error in the feedback from the latter. Existing feedback methods focus on how to better compress CSI feedback and how to compensate for the quantization error after standard channel estimation schemes have been applied. The present invention takes into account the feedback overhead already in the channel estimation stage, rather than compressing the feedback after it has been estimated.

By a-priori restricting the interfering BS1 to a low dimensional signal space in order to reduce the quantization error of the effective interference channel between UE1 and BS2, the residual interference inflicted on UE1 is reduced. The signal space is selected such that the performance loss of the interfering BS1, with regard to its own UEs, e.g. UE1, is diminished. Cutting the number of feedback bits in the wireless control channel will cause a material effect on CoMP gains, since it will enable more BSs to cooperate without additional overhead; therefore improving the tradeoff between the gain from the increased cooperation and the loss due to the higher operating complexity.

An analytic performance analysis of the scheme of the invention shows that the residual interference due to the quantization error is proportional to 2 to the negative inverse power of (m−1) in the proposed scheme in comparison to 2 to the negative inverse power of (n−1) in the standard scheme, where n is the number of antennas at the BS and m is the dimension of the selected signal subspace (the pre-coding matrix) which is smaller than n.

Figure 2:
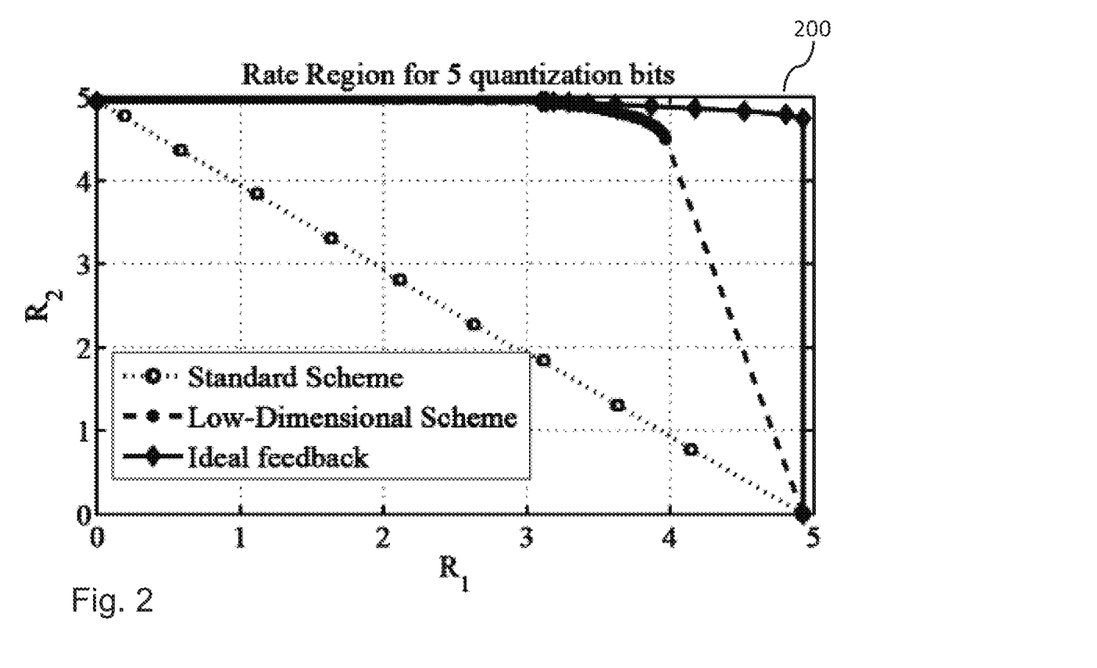
FIG. 2 shows a graph of a rate region trade-off for an implementation of the present invention in a network as depicted in FIG. 1.

As shown in FIG. 2, which provides an example for a case where nt=8 and m=4, the scheme of the invention yields a significantly better rate region.

Figure 3A:
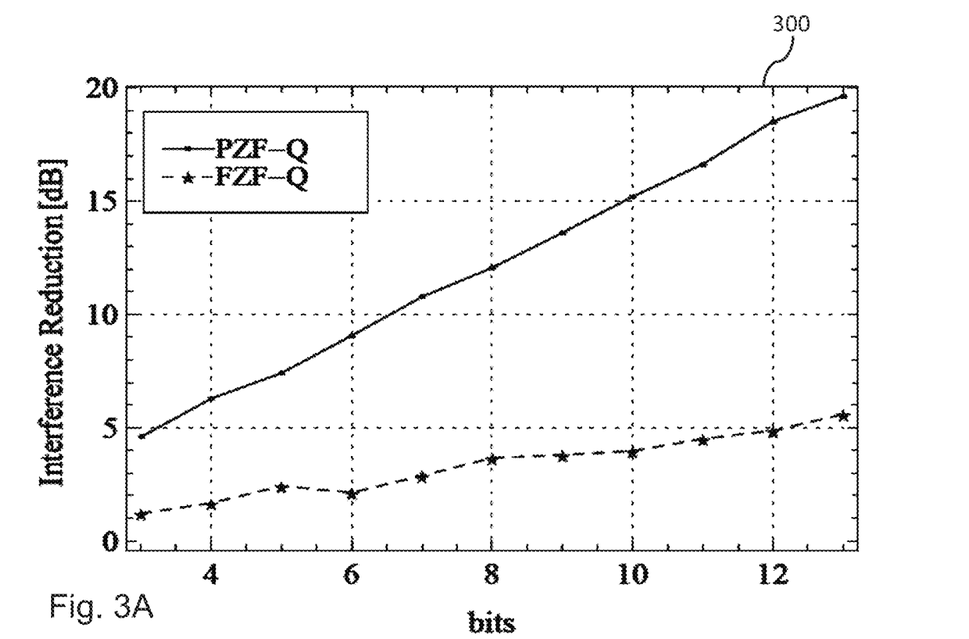
FIGS. 3A-3B show graphs of interference vs. quantization bit trade-offs for an implementation of the present invention in a network as depicted in FIG. 1.
Figure 3B:
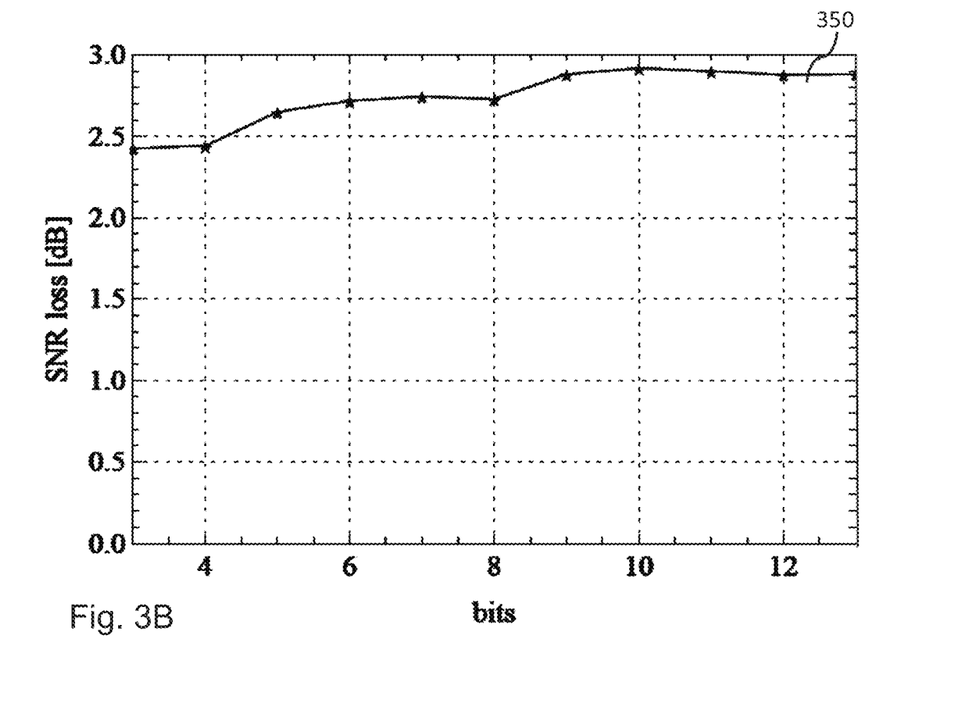

FIGS. 3A-3B show graphs 300 and 350 respectively of interference and SNR loss given Partial Zero Forcing (PZF) and Full Zero Forcing (FZF) for nt=8, nr=1 and m=4 as a function of the number of CDI quantization bits. The channels are Rayleigh fading and $\hat{h}_{ij}$ is quantized using Random Vector Quantization (RVQ) and fed back to BS2. FIG. 3A depicts the reduction in the interference inflicted by BS2 on UE1 while FIG. 3B depicts the UE2 loss in SNR.

In terms of interference reduction, simulation results presented in FIG. 3, show that this scheme achieves a significant interference reduction to UE1 (FIG. 3A) with much less quantization bits; i.e., it cuts the number of feedback bits by a factor of three, and in some cases, by a factor of 4, and only at the expense of a very low performance loss with respect to UE2 (FIG. 3B). In the case of Multi-User MIMO (MU-MIMO), a significant gain is also observed, as shown in FIG. 4.

Figure 4A:
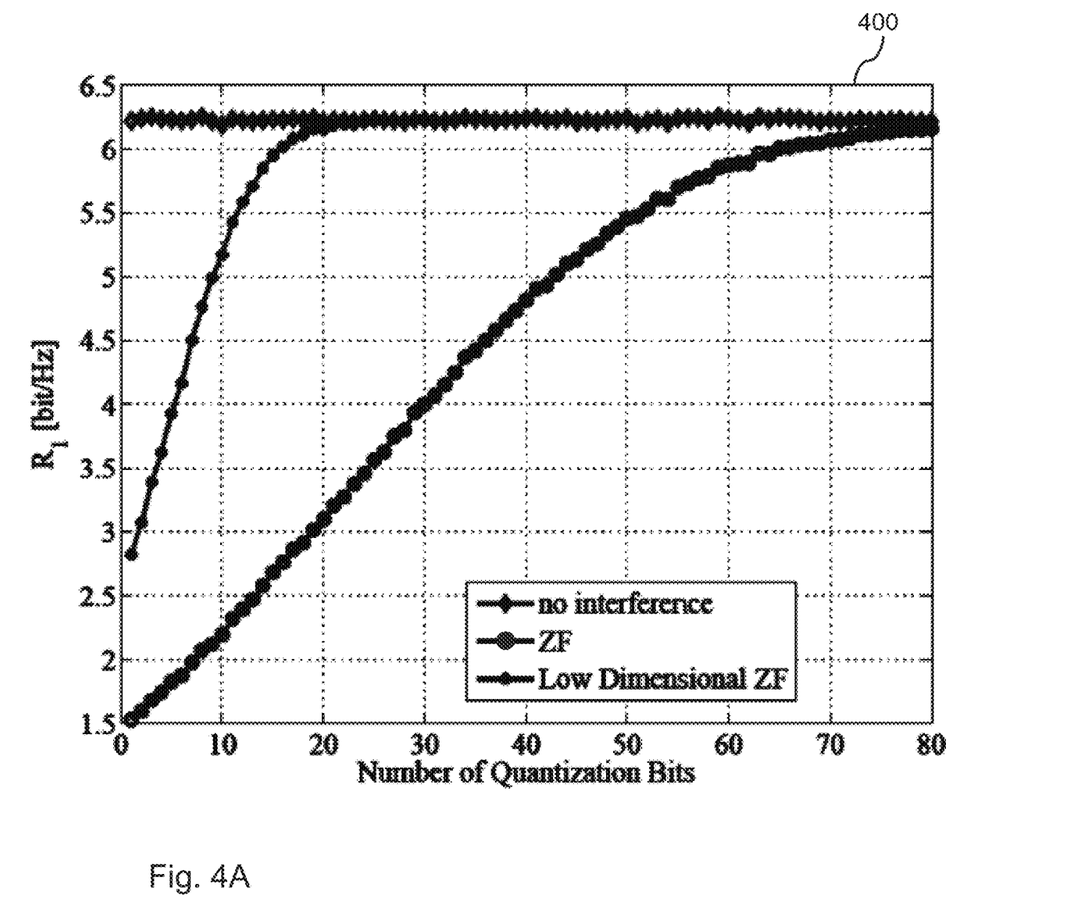
FIGS. 4A-4B show show graphs of rate region vs. quantization bit trade-offs for an implementation of the present invention in a network as depicted in FIG. 1.
Figure 4B:
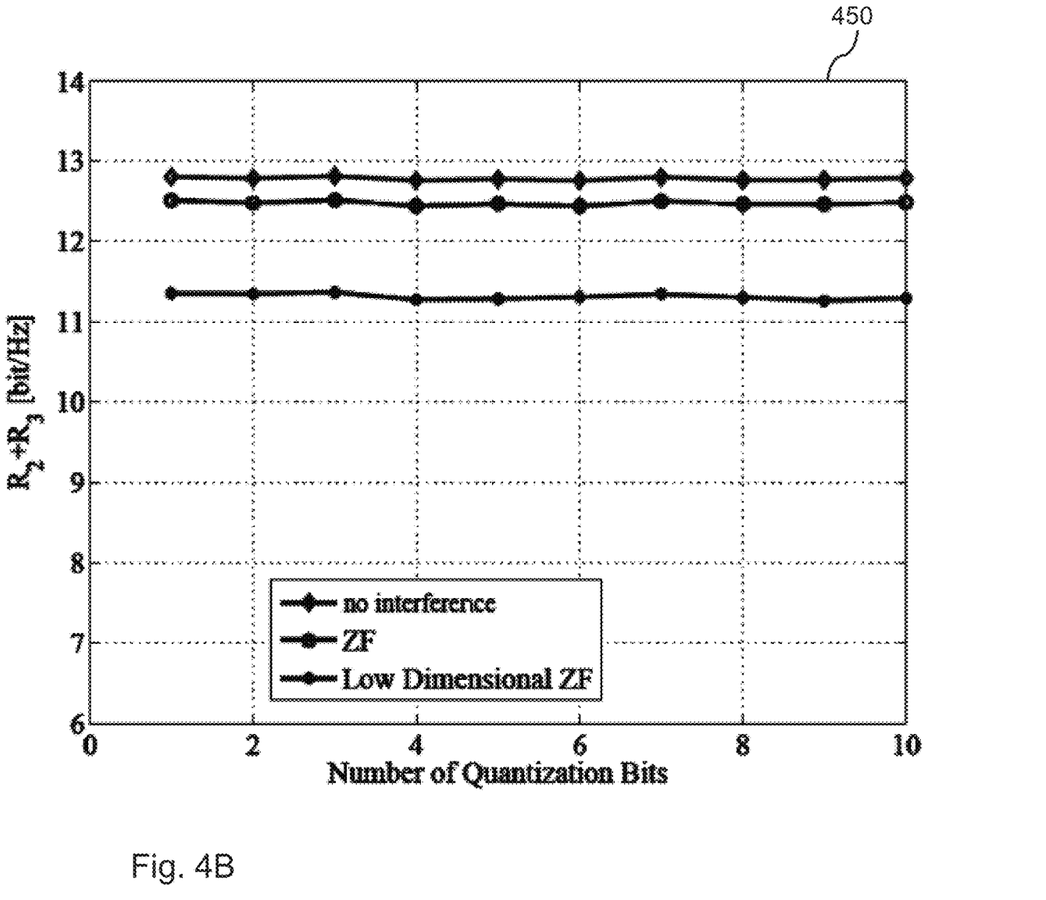

FIGS. 4A-4B show graphs 400 and 450 respectively of rate regions given Partial Zero Forcing (PZF) and Full Zero Forcing (FZF) for two users served by BS2 with nt=8, nr=1 and m=4 as a function of the number of CDI quantization bits. FIG. 4A depicts the rate of UE1 while FIG. 4A depicts the sum-rate UE2 and UE3.

Figure 5:
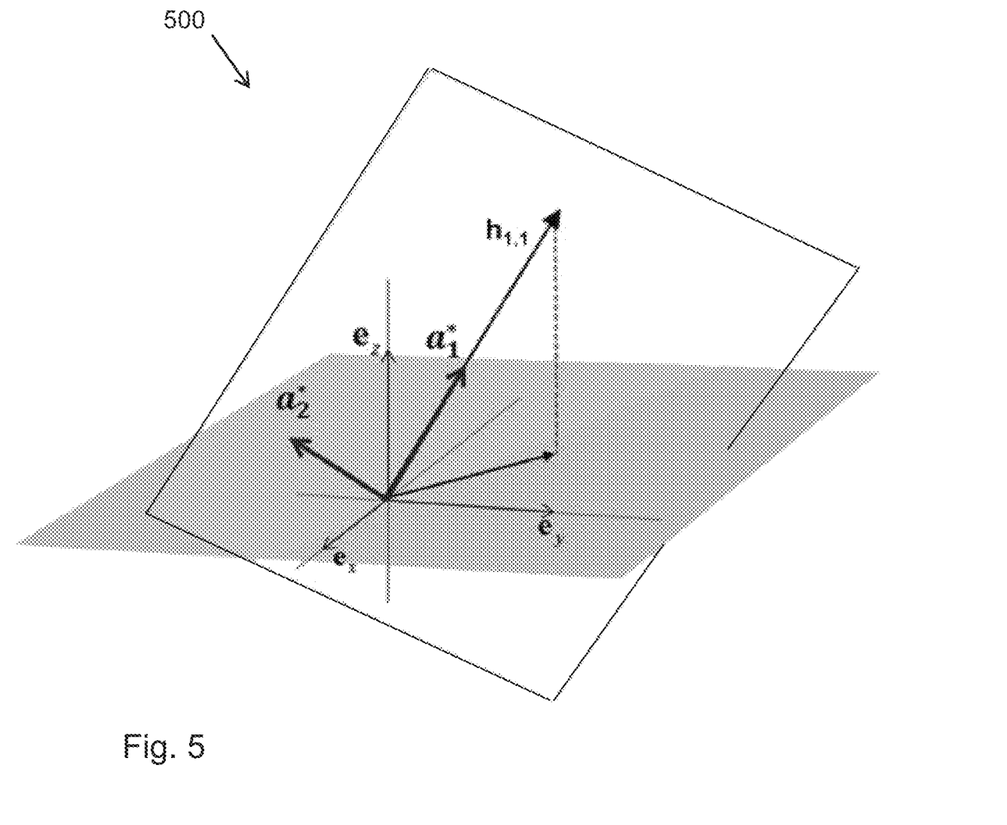
FIG. 5 is a graph illustrating the dimension reduction.

FIG. 5 is a graph illustrating the dimension reduction effected by the methods described above with respect to FIG. 1.

The system and method of the invention eliminate one of the major obstacles preventing CoMP from realizing its potential: the overhead of CSI acquisition and distribution in cellular networks. A significant reduction of this overhead will have a dramatic effect on wireless networks. The transition to cloud networks, the necessity to increase throughput via Long-Term Evolution (LTE) advanced and the increased use of carrier aggregation will all benefit from the invention. By reducing which the overhead for CSI estimation and feedback, the invention addresses one of the major drawback of carrier aggregation; the increase overhead due to the additional channel estimation required. In the short term, it will enable CoMP in LTE advanced networks and even in LTE where CoMP is not used despite a dedicated infrastructure in place. In the long term, the invention will make it possible to incorporate CoMP into 5G. Moreover the invention is very suitable for cloud radio access networks, which is currently the most likely topology to be adapted for 5G. Reducing the CSI overhead is a key issue in such networks, where a, large number of front end radios operate as one and therefore, require a large amount of CSI.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices. The term "computer-readable medium" refers to any medium that participates in providing data (e.g., instructions) which may be read by a computer, a processor or a like device. Such a medium may take many forms, including but not limited to, non-volatile media, volatile media, and transmission media. The present invention is generally configured to work in a network environment including processors that communicate with one or more devices. The processors may communicate with the devices directly or indirectly, via a wired or wireless medium such as the Internet, LAN, WAN or Ethernet, Token Ring, or via any appropriate communications means or combination of communications means. Each of the devices may also comprise computers.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A method for multi-cell coordination in a cellular network comprising a plurality of base stations, each having a plurality of antennas, and comprising a plurality of user equipment devices (UEs), the method comprising steps of:
   transmitting a first training vector signal from n antennas of a base station serving an intended UE;
   receiving at the base station a first feedback signal, including an n-dimensional, quantized vector of a direct channel between the base station and the intended UE, generated by the intended UE from the first training vector signal;
   determining an n×m matrix, wherein m<n, wherein one column of matrix A is the n-dimensional, quantized vector of the direct channel generated by the intended UE, and wherein all columns are orthonormal;
   transmitting a second training vector signal multiplied by the matrix A from the n antennas of the base station;
   receiving at the base station a second feedback signal including an m-dimensional, quantized vector of an interference channel, generated by an unintended UE from the second training vector signal transmitted from the base station;
   generating a subsequent vector signal t according to the quantized direct channel and the quantized interference channel; and
   transmitting the subsequent vector signal t from the base station after multiplying the subsequent vector signal t by the matrix A.

2. The method according to claim 1, wherein generating the subsequent vector signal t, according to the quantized direct channel and the quantized interference channel, comprises reducing residual interference in the interference channel.

3. The method according to claim 1, wherein the steps are repeated at intervals to maintain a high signal-to-noise ratio of the network.

4. The method according to claim 1, wherein generating the subsequent vector signal t, according to the quantized direct channel and the quantized interference channel, comprises generating the subsequent vector signal t to achieve partial or full zero forcing of the interference.

5. The method according to claim 1, wherein generating the subsequent vector signal t, according to the quantized direct channel and the quantized interference channel, comprises generating the subsequent vector signal t to achieve full zero forcing of the interference.

6. A computer-based system comprising base station of a cellular network, wherein the cellular network-comprises a plurality of base stations, each having a plurality of antennas, and a plurality of user equipment devices, the base station serving an intended user equipment device (UE) the base station comprising a processor, antennas, and a memory, wherein the memory includes instructions that when executed by the processor perform the steps of:
   transmitting a first training vector signal from n antennas of a base station serving the intended UE;
   receiving at the base station a first feedback signal, including an n-dimensional, quantized vector of a direct channel between the base station and the intended UE, generated by the intended UE from the first training vector signal;
   determining an n×m matrix A, wherein m<n, wherein one column of matrix A is the n-dimensional, quantized vector of the direct channel generated by the intended UE, and wherein all columns are orthonormal;
   transmitting a second training vector signal multiplied by the matrix A from the n antennas of the base station;
   receiving at the base station a second feedback signal including an m-dimensional, quantized vector of an interference channel, generated by an unintended UE from the second training vector signal transmitted from the base station;
   generating a subsequent vector signal t according to the quantized direct channel and the quantized interference channel; and
   transmitting the subsequent vector signal t from the base station after multiplying the subsequent vector signal t by the matrix A.

7. The system according to claim 6, wherein the base station i configured to repeat the steps at intervals to maintain a high signal-to-noise ratio of the network.

8. The system according to claim 6, wherein generating the subsequent vector signal t, according to the quantized direct channel and the quantized interference channel, comprises generating the subsequent vector signal t to achieve partial zero forcing of the interference.

9. The system according to claim 6, wherein generating the subsequent vector signal t, according to the quantized direct channel and the quantized interference channel, comprises generating the subsequent vector signal t to achieve full zero forcing of the interference.

* * * * *